United States Patent [19]

Disborg

[11] Patent Number: 4,728,216
[45] Date of Patent: Mar. 1, 1988

[54] APPARATUS HAVING CONTROLLED FRICTION CONNECTION BETWEEN TWO PARTS

[75] Inventor: Lennart Disborg, Linköping, Sweden

[73] Assignee: FFV Transmission AB, Linkoping, Sweden

[21] Appl. No.: 932,336

[22] Filed: Nov. 19, 1986

[30] Foreign Application Priority Data

Nov. 21, 1985 [SE] Sweden .................................. 8505509

[51] Int. Cl.$^4$ .............................................. B25E 3/28
[52] U.S. Cl. .................................... 403/282; 403/359; 29/432
[58] Field of Search ................. 403/DIG. 2, 273, 359, 403/282; 29/432; 148/145, 149

[56] References Cited

U.S. PATENT DOCUMENTS

| | | | |
|---|---|---|---|
| 1,157,666 | 10/1915 | Bennett | 29/432 X |
| 2,295,777 | 9/1942 | Denneen et al. | 148/149 X |
| 3,434,747 | 3/1969 | Nichols | 403/344 X |

FOREIGN PATENT DOCUMENTS 1924 1/1980 Japan ..................................... 29/432

*Primary Examiner*—Andrew V. Kundrat
*Attorney, Agent, or Firm*—James E. Nilles; Donald C. McGaughey

[57] ABSTRACT

Each of two parts has a friction surface engaged under a force against a friction surface on the other to inhibit relative motion between the parts in one direction. One of the parts has at its friction surface strip-like hard zones which extend transversely to that direction and which are laterally spaced apart to have a strip-like soft zones between them. The material of that one part is substantially harder in the hard zones than in the soft zones. The material of the other part, at its friction surface, is of such hardness that under the force urging the friction surfaces together, the differences in hardness as between the hard zones and the soft zones of the one part tend to deform the friction surface of that other part into undulations that increase friction in the mentioned direction without substantially increasing friction transversely to that direction.

6 Claims, 7 Drawing Figures

APPARATUS HAVING CONTROLLED FRICTION CONNECTION BETWEEN TWO PARTS

The present invention relates to machine parts formed with a new type of friction connection between two parts that provides what may be referred to as controlled friction.

By controlled friction is meant that the parts are so prepared that the friction coefficient is different for different directions of application of relative force to the apparatus, especially so that the friction coefficient is substantially high for one direction of force application whereas the friction coefficient is maintained normal or low in another direction, or alternatively that the friction coefficient becomes substantially low in one direction and is maintained unchanged and normal in another direction.

The invention also includes the case that the friction coefficient, for instance depending on the design or the preparation of the surfaces, varies in different directions, and it is thereby possible to establish controlled friction according to the invention so that the friction is the same in all directions.

The invention is in the first place intended for machine parts of metal, but it is also very useful in many cases for objects made of other materials such as synthetic resins or for combinations of cooperating elements in which one element is of plastic and the other element is of metal.

As examples of controlled friction the following specification will illustrate some different cases, which should, however be considered only as explanatory examples.

EXAMPLE 1

In order to simplify the mounting and dismounting of a shaft in relation to a hub, but nevertheless provide a high friction for torque transmission between the shaft and the hub it would be desired to keep the friction relatively low in the mounting/dismounting direction, generally in the axial direction, whereas the friction preferably should be high in the torque transmission direction, that is in the direction of rotation.

EXAMPLE 2

In some cases it may be desired to increase the friction of a shaft coupling both in the axial direction and in the direction of rotation, at the same time that the friction is maintained low during the mounting, and this is possible in case the mounting is accomplished by a kind of screwing movement.

EXAMPLE 3

In order to increase the traction ability of an object in relation to another object it is desired to increase the friction in the traction direction, whereas it may be advantageous to keep the friction low in another direction, or it is alternatively of less interest what type of friction is obtained in such other direction. It may for instance be desired to increase the friction between railway tracks and the driving wheel of a railway engine at stations, on sloping surfaces, at places where frost may appear etc. whereby both an improved traction ability and an improved braking ability is obtained.

EXAMPLE 4

In still other cases a constant increase of the friction coefficient between two mutually movable objects may be obtained, for instance a constant increase of the friction of the driving wheel of a railway engine in relation to the railway tracks.

EXAMPLE 5

When mounting and dismounting mechanical friction joints of the type which use cone elements as clamping elements, there is always a movement in the joint when the cone elements are pulled towards each other. This movement is generally axial, but the largest forces to be transmitted through the joint appear in the direction of rotation. It is therefore desired that the friction be low when mounting and dismounting the joint but high when the joint is used.

Many different methods for increasing the friction between two mutually cooperating machine parts are known. German patent No. 559,779 shows an apparatus having a shrinkage fit between a shaft and a hub, in which a number of parallel axially extending rifles or grooves are machined into the shaft, into which the hub material penetrates when the two machine elements are shrunk together so that a non-rotatable joint is obtained. For utilizing the method it is necessary to work one of the machine elements by cutting, in this case the shaft, and it may be difficult or impossible to separate the elements and re-join the elements.

U.S. Pat. No. 2,354,656 shows another method of joining two machine elements by a shrinkage fit in which the female coupling element is of a relatively deformable material and is formed with walls that are convex in the axial direction to have an intimate contact with the shaft upon shrinkage after assembly. In this type of shrinkage fit one of the machine elements must have a special shape, and the joint is essentially only a shrinkage fit without any friction increasing means.

In general, the invention relates to apparatus comprising a pair of machine parts, one of which has a continuos even surface uninterrupted by physical protrusions that is engaged under force against an opposing continuous even surface uninterrupted by physical protrusions on the other part to frictionally inhibit relative motion in one direction between the parts, wherein said one of the parts has elongated, strip-like zones of relatively high hardness which, in a nonengaged condition do not project from said even surface, which extend across its said surface with their lengths substantially transverse to said one direction and which are laterally spaced apart and have between them similar zones that are relatively soft and which do not project from said even surface. The other of said two parts is substantially softer than said hard portions of the one part, at least in those portions of its said opposing surface that are engaged by the zones of relatively high hardness of said one part. Thus under the force that causes those surfaces to be engaged, said opposing surface on the other part tends to be so deformed by the hard portions of the one part as to be undulatory in said direction. It will be seen that if the two parts comprise, for example, a hub and a shaft, and the shaft has axially extending strip-like hardened portions, the shaft can be axially force fitted or shrink fitted into a bore in the hub and its hardened portions will tend to deform the surface of the bore into circumferential undulations such that there will be high friction between the shaft and the hub in each direction of rotation but a substantially lower friction between them in the axial direction. Where the parts comprise a railway track and a locomotive wheel, the hard zones may be formed at the upper surface of the track, extending transversely to its length, and/or on the periphery of the wheel, extending axially. In any case, elongated hard zones alternating with elongated softer zones may be provided on both of two frictionally engaged parts, and it will be understood that these zones on the two parts are so arranged that a hard zone on one always engages a soft zone on the other.

The alternating zones of harder and softer material of a part may be provided either by hardening the material along the harder zones or by softening the material along the softer zones. The hardening and softening operations may be such as to cause no change in the shape or dimensions of the affected part, so that the part can be finished to its final desired shape and dimensions before the hardening or softening operation is performed on it. Usually, hardening the material of one part along strip-like zones will result in an increased friction between the parts in the direction transverse to the length of those zones, whereas softening the material along similar zones will decrease the friction between the parts in that direction.

For reducing the friction coefficient of certain portions of the material it is possible to treat the material to provide a reduction of the hardness by partially doping it, or friction reducing particles can be baked or pressed into the material.

For increasing the friction coefficient it is possible to quench the machine part or machine parts locally in any known manner, for instance by laser quenching, so that the part or parts obtain quenched portions having an increased hardness in the direction that favors the intended increased friction. Another possibility is to dope the material of one or both machine elements by pressing or baking harder particles into the material in a formation that increases the friction in a predetermined desired direction and leaves the friction unchanged in another direction.

The quenching, for instance the laser quenching, is favorable in that the method can be used for available objects, whereby said objects are not influenced as to shape or dimensions; hence it is possible to adapt the shape, the localization and the size of the quenched portions so as to obtain the desired effect. Any and all objects can be quenched independently of the shape and size, and the quenching normally is done to provide a certain number of elongated parallel quenched portions which may extend axially, helically, or in any other formation. The number of parallel quenched portions is adapted to the circumstances and to the intended effect. In this case the invention presupposes that both machine parts are designed for being joined by a press fit, whereby the quenched portions of one part are slightly pressed into the softer surface portions of the other part. In case both machine elements are formed with quenched portions it is foreseen that said quenched portions are mutually so arranged that the quenched portions of one machine element are located between the quenched portions of the other machine element when the elements are pressed together.

The joining of the machine elements provided as mentioned above is accomplished relatively easily whereas the elements are locked in the direction of rotation by a substantially higher force than is obtained in case of a corresponding normal press or shrinkage fit.

As mentioned above it is possible to provide the quenched portions in a helical formation, whereby the joining and a possible later dismounting likewise takes place with a screwing motion. Such an apparatus gives an increased friction both in the axial direction and in one direction of rotation, but it is obvious that the system is not suited for reverse torque transmitting motion.

It is also possible to provide the quenched portions by a point by point quenching, carried out in such a manner that the quenched points are located in line with each other as in the above mentioned linear quenching.

When doping the material of one of the machine elements with harder particles it is also possible to start with already formed machine elements and to press such harder particles into the surface layer of one or both machine elements, or the machine element or elements can be formed with such harder particles during the forging operation or in any other stage of the element manufacturing process. The machine element, as an entire object, can be made of pressed powdered material so produced that powder having a higher hardness is applied in a certain predetermined direction, for instance in rows or lines which are parallel with each other or in screw formation. The particles may be hard metal particles, particles of sintered material, ceramic particles or any other hard particles which are well known within the powder metallurgical field.

The invention is illustrated diagrammatically in the accompanying drawings which illustrate what are now regarded as preferred embodiments of the invention.

Figure 1:
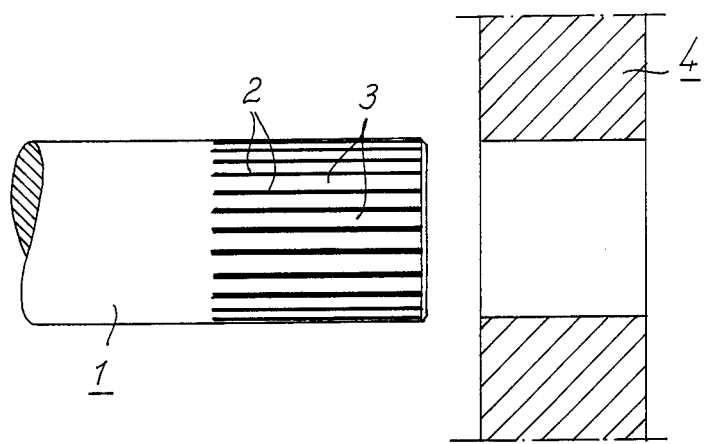
FIG. 1 shows an embodiment of a shaft-hub coupling.

FIG. 1 shows a shaft 1 that has one end portion which is hardened or quenched locally in the form of several axially extended quenched narrow or wide zones 2, so that the material in those zones 2, after the quenching operation, is harder than the material of the intermediate portions 3. In the illustrated case the hub 4 that is to receive said end portion of the shaft 1 has no quenched portions. The shaft, as well known, is pressed or shrink-fitted into the hub. In the connected condition of the parts, under the radial force that maintains firm engagement between the circumferential surface of the end portion of the shaft and the bore surface in the hub, the quenched portions 2 penetrate slightly into the material of the hub thereby providing an increased resistance against rotation between the shaft and the hub. It is, however, quite possible to dismount the hub from the shaft by pulling the shaft out of the hub in the axial direction.

Figure 2:
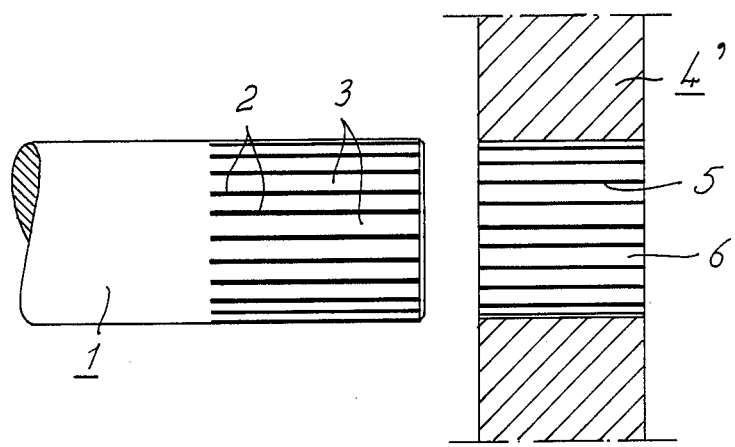
FIG. 2 shows another embodiment of a shaft-hub coupling.

FIG. 2 shows an apparatus which differs from that of FIG. 1 only in that both the shaft end and the hub are in this case formed with quenched axially extending portions 2 and 5, respectively, having substantially the same mutual distribution, so that when the parts are connected, the respective quenched portions 2 and 5 of each part opposingly engage the softer portions 3 and 6, respectively, of the other part.

Figure 3:
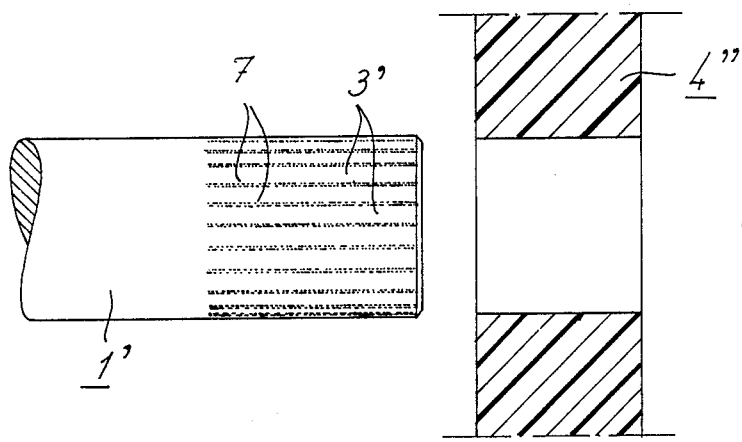
FIG. 3 shows a third embodiment of a shaft-hub coupling.

FIG. 3 also shows, as in FIG. 1, a shaft end which has been doped with particles 7 of a material which is harder than the material of the remainder of the shaft and which are located along strip-like zones like the above described quenched portions.

Figure 4:
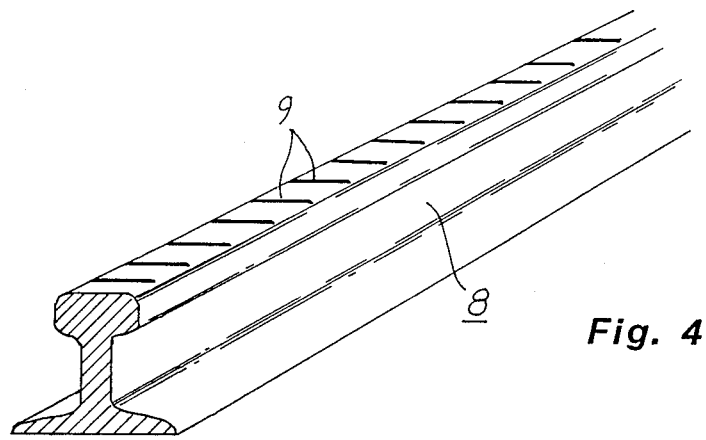
FIG. 4 shows a railway track formed according to the invention.

FIG. 4 shows a little part of a railway track 8 having a number of transversely extending quenched portions 9 providing an increased friction between the railway track and the railway wheel to reduce possible sliding between the wheel and the railway track and thereby increase the traction ability of the engine wheels against the railway tracks and increase the wheel friction against the track during braking.

Figure 5:
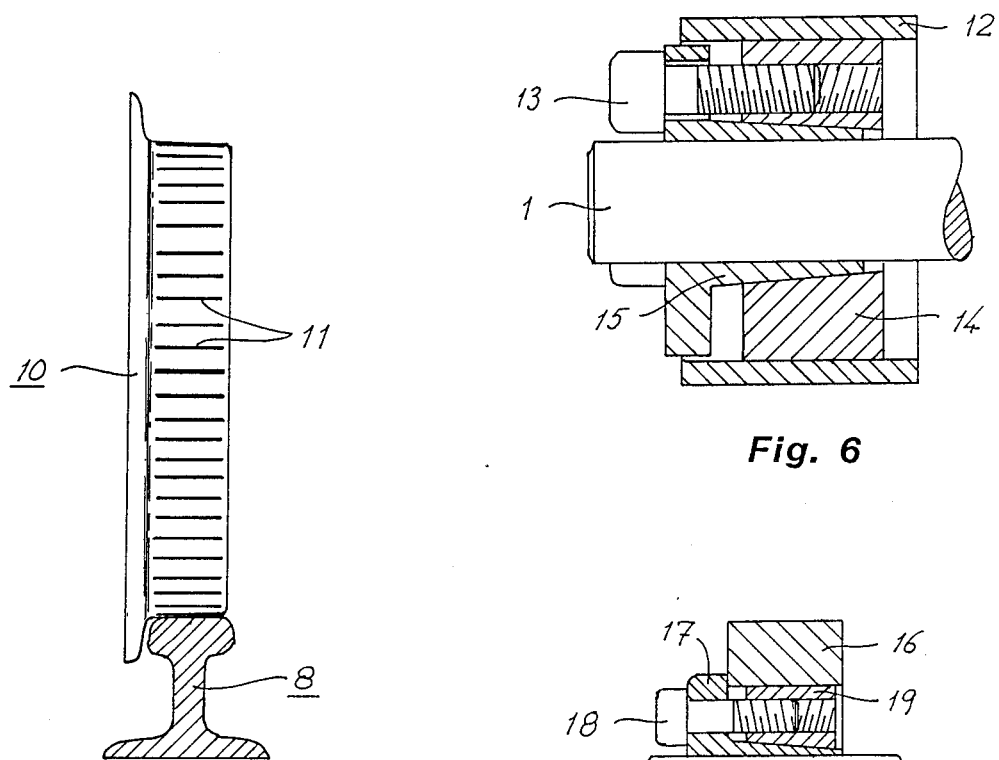
FIG. 5 shows a drive wheel of a railway engine running on a railway track.

FIG. 5 shows an alternative embodiment, in which the drive wheel 10 of the railway engine or any other wheels of the train unit are formed with transversely extended quenched portions 11 or portions having particles of a harder material than the material of the wheel or wheels, which portions are suitably distributed around the periphery of the wheel.

Figure 6:
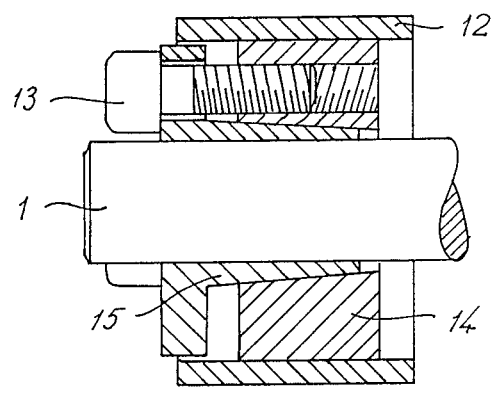
FIGS. 6 and 7 show cone coupling joints in which some surface portions have been modified with reference to the friction.

FIG. 6 shows a shaft-hub coupling having a friction joint allowing the hub 12 to move axially when the joint is mounted, that is when the screw 13 is tightened. Thereby the part 14 and the hub 12 move axially on the cone element 15. When mounted, the joint is intended to mainly transfer forces in the direction of rotation, and to this end either the part 14 or the cone element 15 or both are formed with axial and parallel friction increasing or friction reducing narrow or wide portions round the common surface, which portions provide the intended controlled friction.

Figure 7:
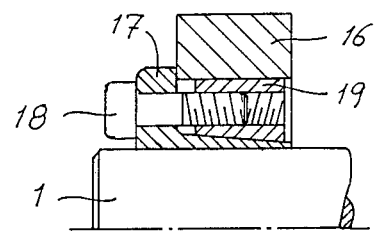

FIG. 7 shows a shaft coupling of friction joint type which does not allow the hub 16 to move axially when the joint is connected. This is prevented in that the flange part of the cone element 17 extends outside the inner diameter of the hub 16. When the screw 18 is tightened the hub 16 is pressed against the cone element flange. When mounting the joint the cone part 19 must be pressed to the cone element 17 and be forced to expand towards the hub 16, and then the cone part 19 has to slide both against the cone element 17 and the hub 16, and at the same time it is necessary that the said two contact surfaces transmit as large friction forces as possible. This is substantially simplified if the surfaces between the cone part 19, on one hand, and the cone element 17 and the hub 16 on the other hand, or all surfaces, are formed so as to give the above defined controlled friction thereby giving a low friction of the surfaces for mounting/dismounting purposes of the joint at the same time as the joint can transmit large torques in the direction of rotation.

In most of the above examples the machine parts may be made of metal, but they may alternatively be made of other materials. It is thus advantageous to form the shaft of FIGS. 1-3 of metal and the hub of a suitable plastic material, a pressed fibrous material or a similar material, and it is also possible to form both the shaft and the hub of plastic material, a fibrous material or a similar material especially for the application according to which one or both machine parts are doped with particles of a hard material.

The invention makes it possible to increase the friction coefficient between two interjoined machine parts, and it is quite possible to increase the friction coefficient by up to 50%.

It is to be understood that the illustrated and described embodiments of the invention are only examples and that many modifications may be presented within the scope of the appended claims.

What is claimed as the invention is:

1. Apparatus comprising a pair of parts, one of which has a continuous even surface that is engaged under a force against an opposing continuous even surface on the other part to frictionally inhibit relative motion in at least one direction between said parts, said apparatus being characterized by:
   A. said one part
      (1) having at its said surface, when in a nonengaged condition,
         (a) a plurality of strip-like hard zones which do not protrude from said even surface, have their lengths substantially transverse to said direction and which are laterally spaced apart and
         (b) strip-like soft zones between said hard zones which do not protrude from said even surface, and
      (2) having substantially greater hardness in said hard zones than in said soft zones; and
   B. the material of the other of said parts at said opposing surface thereof being of such hardness that when in an engaged condition under said force the differences in hardness as between said hard zones and said soft zones tend to produce in said opposing surface undulations in said direction.

2. The apparatus of claim 1 wherein said one part is surface hardened in its said hard zones.

3. The apparatus of claim 1 wherein said one part has, only in its said hard zones, particles of a material which is substantially harder than the material comprising the remainder of that part and whereby said substantially greater hardness is imparted to said hard zones.

4. The apparatus of claim 1 wherein said one part has, only in its said soft zones, particles of a material substantially softer than the material of the remainder of that one part including said hard zones thereof.

5. The apparatus of claim 1 wherein said one part has, only in its soft zones, particles of a self-lubricating material.

6. The apparatus of claim 1 wherein said one part and said other part are in rolling engagement with each other, and wherein said one part and/or said other part are formed with said strip-like hard zones.

* * * * *